United States Patent
Bartelt

(10) Patent No.: US 9,789,802 B2
(45) Date of Patent: Oct. 17, 2017

(54) HIGH CAPACITY HYDRAULIC TRUCK LOADING SYSTEM

(71) Applicant: Douglas A Bartelt, Milwaukee, WI (US)

(72) Inventor: Douglas A Bartelt, Milwaukee, WI (US)

( * ) Notice: Subject to any disclaimer, the term of this patent is extended or adjusted under 35 U.S.C. 154(b) by 385 days.

(21) Appl. No.: 14/459,162

(22) Filed: Aug. 13, 2014

(65) Prior Publication Data

US 2016/0046227 A1   Feb. 18, 2016

(51) Int. Cl.
*B60P 1/64* (2006.01)

(52) U.S. Cl.
CPC .................... *B60P 1/6463* (2013.01)

(58) Field of Classification Search
USPC ................. 414/498, 608, 491, 546
See application file for complete search history.

(56) References Cited

U.S. PATENT DOCUMENTS

| | | | |
|---|---|---|---|
| 4,053,074 A * | 10/1977 | Lemaire | B60P 1/483 |
| | | | 414/491 |
| 4,111,321 A * | 9/1978 | Webster | B60P 1/6463 |
| | | | 280/763.1 |
| 5,601,393 A | 2/1997 | Waldschmitt | |
| 5,620,296 A | 4/1997 | McMahon et al. | |
| 6,158,947 A | 12/2000 | Goiran et al. | |
| 6,457,931 B1 | 10/2002 | Chapman | |
| 7,300,239 B2 | 11/2007 | Benedikt | |
| 8,021,096 B2 | 9/2011 | Railsback | |
| 2007/0212205 A1 | 9/2007 | Lowecki | |

* cited by examiner

*Primary Examiner* — Saul Rodriguez
*Assistant Examiner* — Willie Berry, Jr.
(74) *Attorney, Agent, or Firm* — Absolute Technology Law Group, LLC; Jill Welytok

(57) ABSTRACT

The present invention is a system for high capacity hydraulic truck loading. The system includes a frame to which a hydraulic cylinder is pivotably at a first cylinder pivot. The hydraulic cylinder, when actuated, applies a force to an L-shaped primary arm at a second cylinder pivot. This force cause the primary arm to pivot around various pivot points in a linkage assembly made up of the frame, a U-shaped secondary arm and a plurality of stabilizer arms. The respective positions of the connecting pivots and linkages allow the primary arm to raise or lower an item for loading without contacting a truck tailgate or bumper.

18 Claims, 13 Drawing Sheets

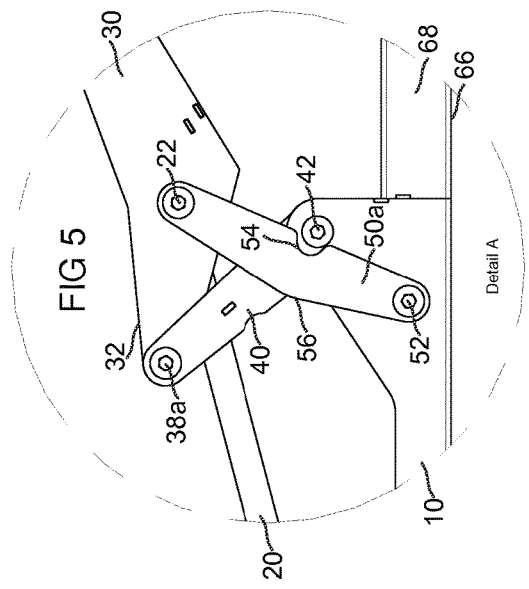
FIG 5
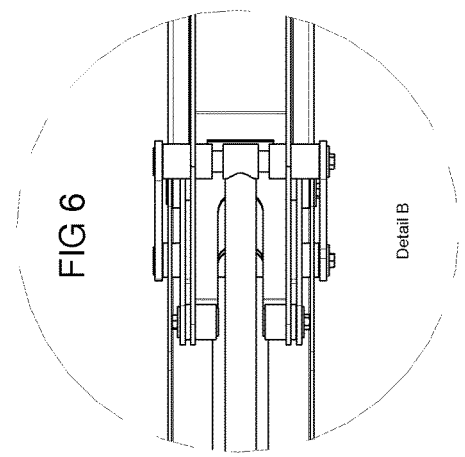
FIG 6
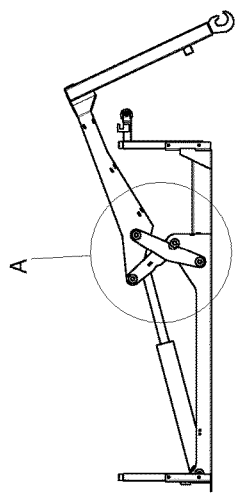
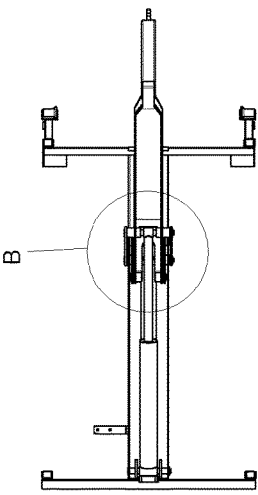

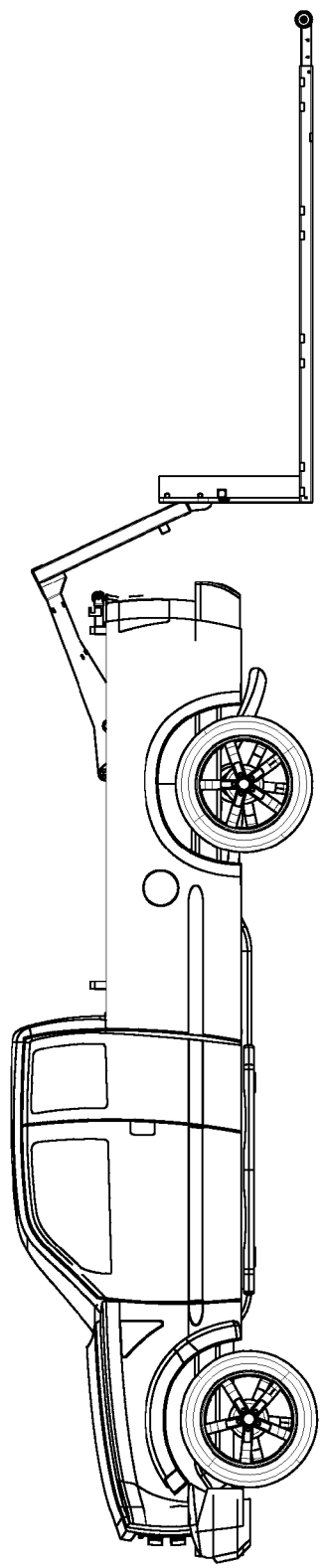

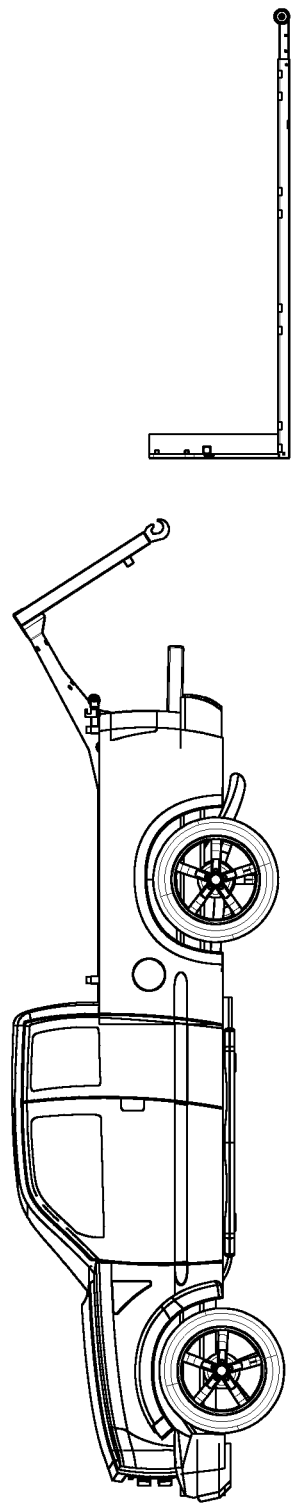

HIGH CAPACITY HYDRAULIC TRUCK LOADING SYSTEM

FIELD OF INVENTION

This invention relates to the field of material and article handling, and more specifically to self-loading or unloading vehicles where raising or lowering of the load or load holder includes curvilinear movement.

BACKGROUND

Hydraulic lift systems are known in the art for lifting heavy objects into pickup trucks. The design of many of these allow loading large, heavy items, such as heavy equipment, motorcycles, tractors, ATV's and snowmobiles. These items typically weigh from 500 to 5,000 pounds. Hydraulic lift systems usually lift the items from ground level and into the truck.

Hydraulic systems known in the art typically have a single pivot arm with either a direct hydraulic cylinder attachment or attachment to other components forming a link to the cylinder.

The amount of weight that the system can accommodate is limited by the amount of weight that the pivoting arm can accommodate when the pivot arm is fully extended. At the point where the pivot arm is fully extended, the hydraulic cylinder cannot exert significant force.

Optimum load bearing capability of the pivot arm occurs when the pivot arm is substantially perpendicular to the axis of rotation (90 degrees). As the pivot arm raises or lowers and the angle differential from 90 degrees increases, the load bearing capability of the pivot arm decreases.

A lever, such as the pivot arm, makes work easier by reducing the force needed to move a load. Work, in physics, is the product of the force used to lift a load multiplied by the distance the force, or effort, is applied. This relationship can be written mathematically as:

Work=Force×Distance.

A leveraged hydraulic lift system depends on the placement of the fulcrum along the lever, the length of the force application side of the lever to relative to the length of the weight bearing side of the lever. The force application side of the lever must be as long as possible, and the weight bearing side of the lever must be as short as possible.

This presents a problem known in the art with respect to hydraulic lift systems for trucks. The truck bed length practically limits the length of the force application side of the lever. The length of the weight bearing side of the lever must be sufficient to contact an item on the ground and raise the item high enough to allow it to be stored. This can result in the weight bearing side of the lever becoming unwieldy and impractically long for lifting heavy objects.

Hydraulic lift systems known in art are limited as to the amount of weight they can lift by the length of the weight bearing side of the lever required for object clearance. Components such as tailgates and trailer hitches must often be removed from the rear of the truck to maximize leverage.

SUMMARY OF THE INVENTION

The present invention is a system for high capacity hydraulic truck loading. The system includes a frame to which a hydraulic cylinder is pivotably at a first cylinder pivot. The hydraulic cylinder, when actuated, applies a force to an L-shaped primary arm at a second cylinder pivot. This force cause the primary arm to pivot around various pivot points in a linkage assembly made up of the frame, a U-shaped secondary arm and a plurality of stabilizer arms. The respective positions of the connecting pivots and linkages allow the primary arm to raise or lower an item for loading without contacting a truck tailgate or bumper.

BRIEF DESCRIPTION OF THE DRAWINGS

FIG. 5 illustrates a magnified partial side view of the system.

FIG. 6 illustrates a magnified partial over view of the system.

FIGS. 8a-8d illustrate side views of the system in use on a long-bed truck.

FIGS. 9a-9d illustrate side views of the system in use on a short-bed truck.

TERMS OF ART

Figure 1A:
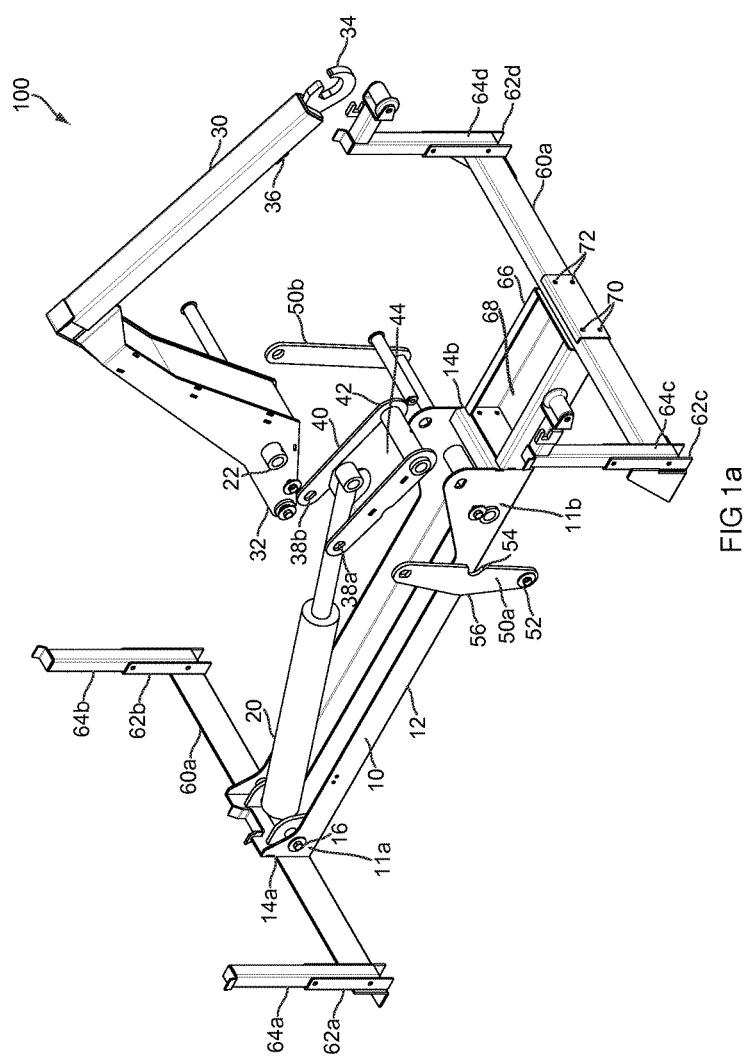
FIG. 1a illustrates an exploded proximal perspective view of a system for high capacity hydraulic truck loading.

As used herein, the term "hydraulic cylinder" means a mechanical actuator used to provide a unidirectional force through a unidirectional stroke.

As used herein, the term "truck" means a truck, van, sport utility vehicle or trailer.

DETAILED DESCRIPTION OF INVENTION

For the purpose of promoting an understanding of the present invention, references are made in the text to exemplary embodiments of a high capacity hydraulic truck loading system, only some of which are described herein. It should be understood that no limitations on the scope of the invention are intended by describing these exemplary embodiments. One of ordinary skill in the art will readily appreciate that alternate but functionally equivalent elements may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale. Instead, emphasis has been placed upon illustrating the principles of the invention. Like reference numerals in the various drawings refer to identical or nearly identical structural elements.

Moreover, the terms "about," "substantially" or "approximately" as used herein may be applied to modify any quantitative representation that could permissibly vary without resulting in a change in the basic function to which it is related.

FIG. 1a illustrates a proximal perspective view of a system 100 for high capacity hydraulic truck loading. System 100 includes a frame 10, a hydraulic cylinder 20, a primary arm 30, a secondary arm 40, two stabilizer arms 50a and 50b, optional saddle assemblies 60a and 60b and a plurality of fasteners 70 and fastener apertures 72.

Frame 10 is a rectangular frame having a frame first end 11a on its distal end and a frame second end 11b on its proximal end. Using truck attachment interface 12, frame 10 can connect to the truck permanently through welding or removably using a plurality of fastener apertures 72, through which a plurality of fasteners 70 are inserted. Optionally, frame 10 also removably connects to saddle assemblies 60a and 60b at saddle attachment interfaces 14a and 14b. Each of saddle attachment interfaces 14a and 14b includes a plurality of fastener apertures 72, through which a plurality of fasteners 70 are inserted. Frame 10 also includes a first cylinder pivot 16 located on a distal end of frame 10, to which a distal end of hydraulic cylinder 20 pivotably attaches.

Hydraulic cylinder 20 both extends and contracts to provide motion to primary arm 30. A proximal end of hydraulic cylinder 20 pivotably attaches to primary arm 30 at second cylinder pivot 22. Second cylinder pivot 22 also connects to stabilizer arms 50a and 50b.

Primary arm 30 is a L-shaped arm that raises and lowers heavy items, such as a deck with an attached vehicle, and stows them on or in a truck. Primary arm 30 has a primary arm base 32 having a flared configuration. Primary arm base 32 extends from primary arm 30 at a non-straight angle. At an end opposite primary arm base 32, primary arm 30 also includes an integrated hook 34, which connects to the item to be raised or lowered. Integrated hook 34 can connect to and raise or lower and detach from the item without operator interference. Optionally, integrated hook 34 may be replaced with another end effector for use in different applications. Primary arm 30 may also include an optional locking protrusion 36. Locking protrusion 36 connects to the loaded item and stabilizes it during transport. Primary arm pivots 38a and 38b pivotably connect primary arm 30 to secondary arm 40.

Secondary arm 40 is a U-shaped arm. The arms of the U shape include two primary arm pivots 38a and 38b, pivotably connecting secondary arm 40 to primary arm 30. The base of the U shape includes a secondary arm pivot 42, pivotably connecting secondary arm 40 to frame 10. Secondary arm pivot 42 is located on frame second end 11b, proximally to primary arm pivots 38a and 38b. Secondary arm insert 44 is a U-shaped portion located inside of secondary arm 40 to provide strength.

Two stabilizer arms 50a and 50b also pivotably connect to frame 10 at stabilizer pivot 52. Stabilizer pivot 52 is located on frame second end 11b, proximally to primary arm pivots 38a and 38b. Stabilizer pivot 52 is also located at a lower height on frame 10 than secondary arm pivot 42. Stabilizer arms 50a and 50b bracket second frame end 11b and primary arm base 32 to stabilize the entire assembly. In the exemplary embodiment, stabilizer arms 50a and 50b are stadium-shaped plates having holes in each end. At least one of stabilizer arms 50a or 50b also includes a pivot notch 54 in one side. At a certain point in the rotation of primary arm 30, pivot notch 54 comes into contact with and nests over secondary arm pivot 42, thereby arresting the rotational motion of stabilizer arms 50a and 50b and providing support to primary arm 30. The circular arc of pivot notch 54 corresponds to a circular arc of secondary arm pivot 42. Optionally, a strengthening protrusion 56, located on a side opposite pivot notch 54, provides additional reinforcement to stabilizer arm 50a or 50b.

Optional saddle assemblies 60a and 60b provide an additional connection to frame 10 and the truck. Fastener apertures 72 located in central positions of saddle assemblies 60a and 60b allow the use of additional fasteners 70 to removably connect saddle attachment interfaces 14a and 14b of frame 10 to saddle assemblies 60a and 60b. Saddle assembly 60a has a reversed L-shaped cross-section, while saddle assembly 60b has a hollow rectangular cross-section. Each of saddle assemblies 60a and 60b may also include two post channels 62a and 62b, and 62c and 62d, respectively, at either end, removably connected through the use of multiple fasteners 70 and fastener apertures 72. These upright post channels 62a-62d have U-shaped cross-sections to accommodate saddle posts 64a-64d, which are also removably connected through the use of multiple fasteners 70 and fastener apertures 72. Saddle posts 64a-64d provide support to items that have been raised into the truck, raising them above the truck bed.

In certain embodiments, saddle assembly 60b attaches directly to frame 10. In other embodiments, due to the length of the truck bed, a spacer 66 interposes between saddle assembly 60b and frame 10. Spacer 66 removably attaches at either end to saddle assembly 60b and frame 10 through the use of multiple fasteners 70 and fastener apertures 72. Space 66 also includes a channel forestructure 68, which reduces the weight of spacer 66.

Figure 1B:
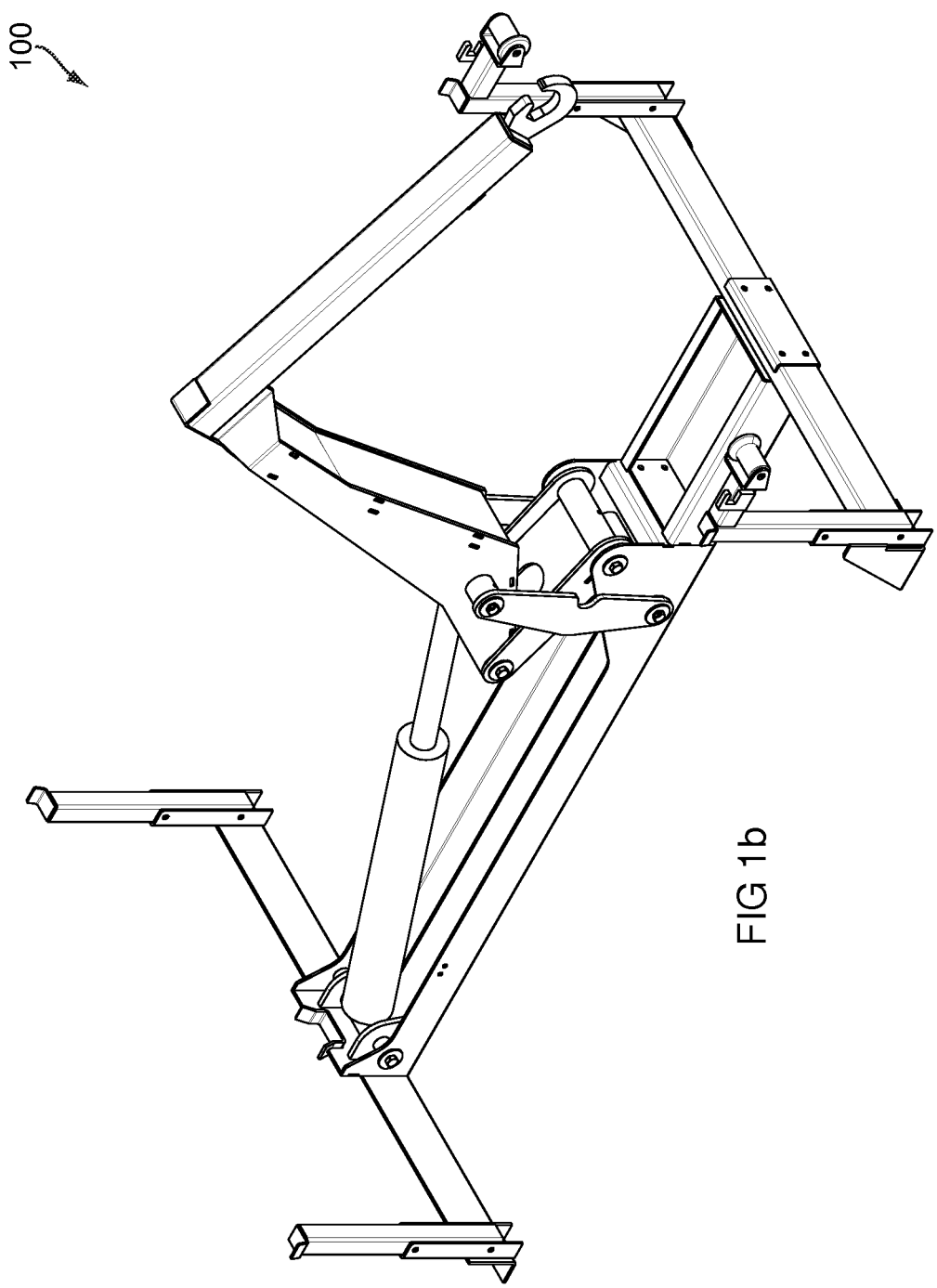
FIG. 1b illustrates a proximal perspective view of the system.

FIG. 1b illustrates a proximal perspective view of system 100.

Figure 2:
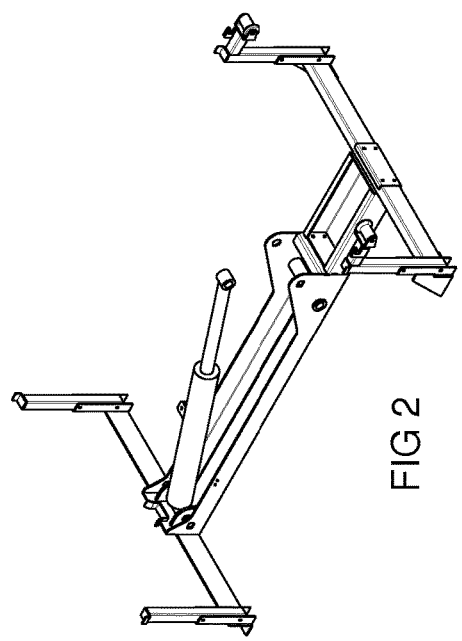
FIG. 2 illustrates a proximal perspective view of the frame, hydraulic cylinder, saddle assembly, post channels, saddle posts, spacer and channel forestructure.

FIG. 2 illustrates a proximal perspective view of frame 10, hydraulic cylinder 20, saddle assembly 60a, 60b, post channels 62a-62d, saddle posts 64a-64d, spacer 66 and channel forestructure 68.

Figure 3:
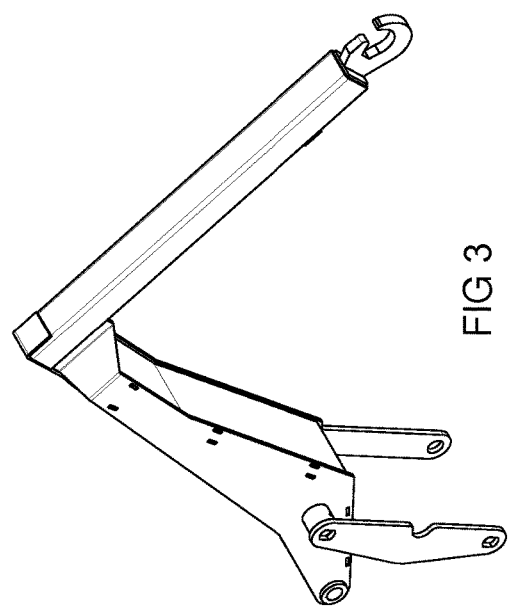
FIG. 3 illustrates a proximal perspective view of the primary arm and stabilizer arms.

FIG. 3 illustrates a proximal perspective view of primary arm 30 and stabilizer arms 50a and 50b.

Figure 4:
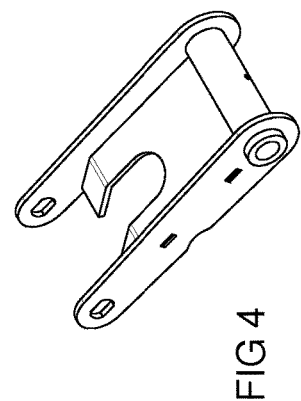
FIG. 4 illustrates a proximal perspective view of the secondary arm.

FIG. 4 illustrates a proximal perspective view of secondary arm 40. FIG. 5 illustrates a magnified partial side view of system 100.

FIG. 6 illustrates a magnified partial over view of system 100.

Figure 7A:
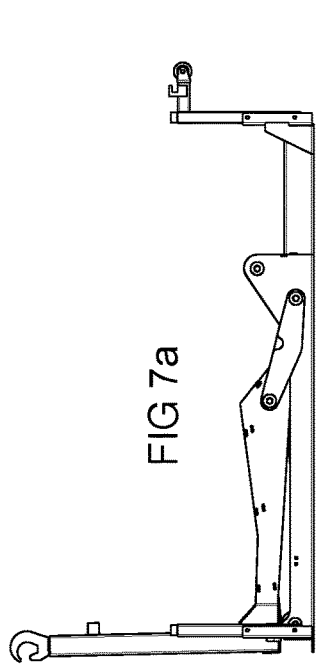
FIGS. 7a-7d illustrate a side view of the system in varying stages of movement.
Figure 7B:
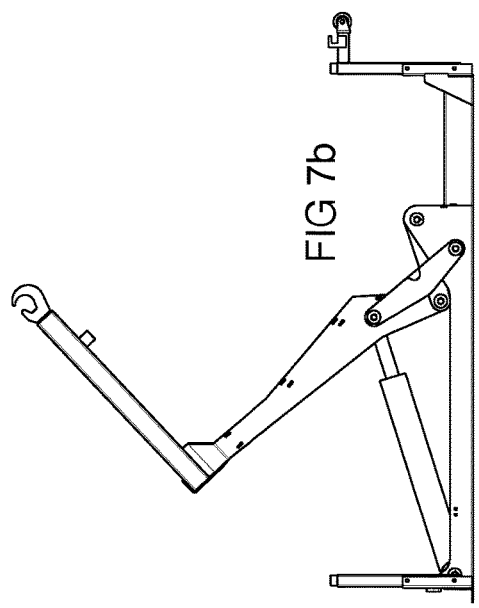

FIGS. 7a-7d illustrate a side view of system 100 in varying stages of movement. In FIG. 7a, system 100 is at rest. In FIG. 7b, actuated hydraulic cylinder 20 applies a motive force at second cylinder pivot 22. This force causes primary arm 30 to rotate around primary arm pivots 38a and 38b, which function as the fulcrum.

Figure 7C:
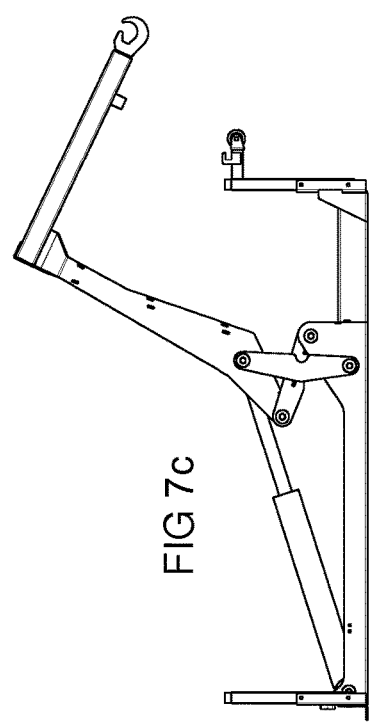

In FIG. 7c, actuated hydraulic cylinder 20 continues to apply a motive force at second cylinder pivot 22. The combined linkage of secondary arm 40 and stabilizer arms 50a and 50b causes primary arm 30 to rotate around primary arm pivots 38a and 38b, secondary arm pivot 42 and stabilizer pivot 52. All of these pivots function as the fulcrums. The location of secondary arm pivot 42 and stabilizer pivot 52 proximal of primary arm pivots 38a and 38b prevents primary arm 30 from contacting tailgate or bumper structures in its lowest position.

Figure 7D:
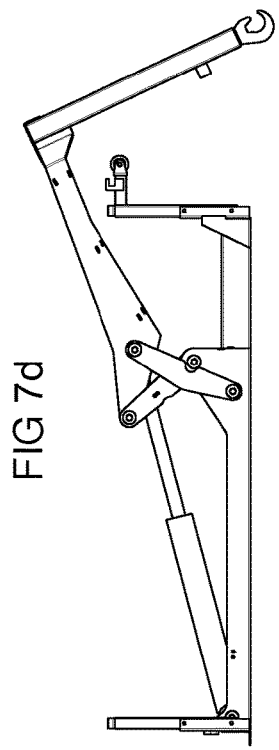

FIG. 7d shows that as stabilizer arm 50a rotates, pivot notch 54 comes into contact with and nests over secondary arm pivot 42, arresting the rotational motion of stabilizer arms 50a and 50b and providing support to primary arm 30.

Figure 8A:
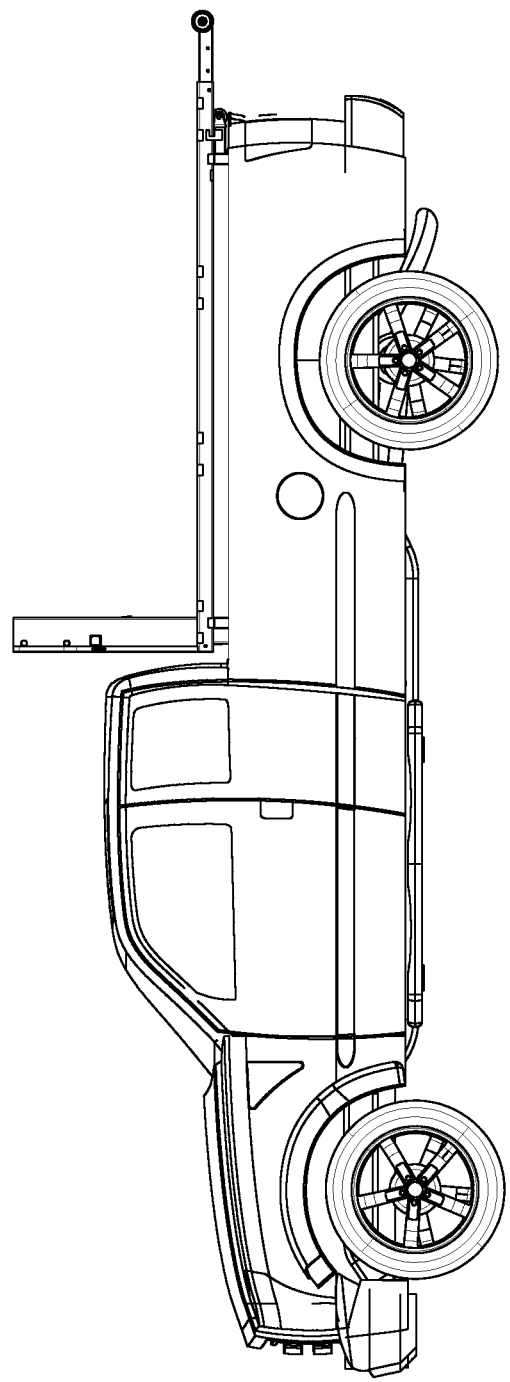
Figure 8B:
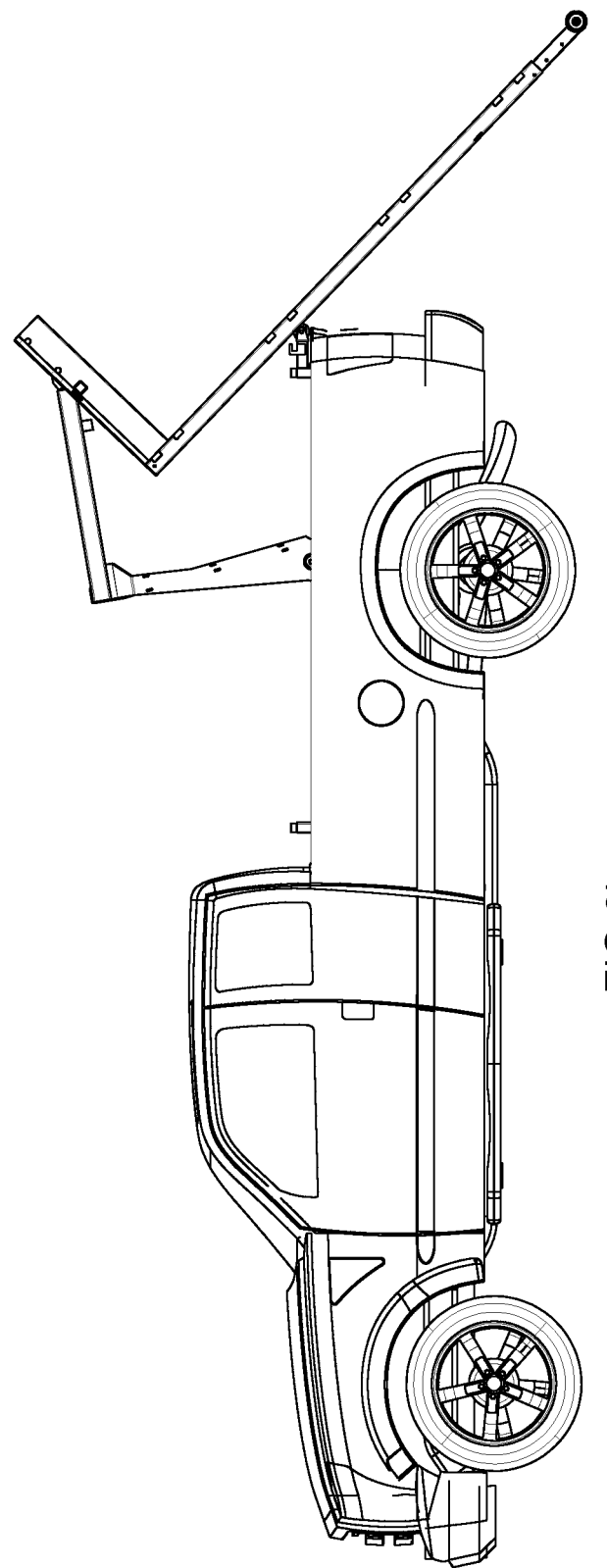
Figure 8D:
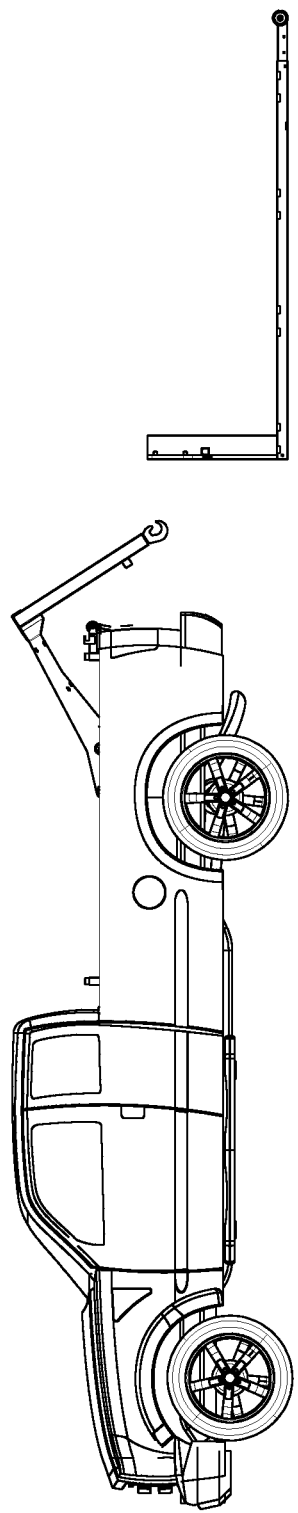

FIGS. 8a-8d illustrate side views of system 100 in use on a long-bed truck. As can be seen in FIG. 8c, primary arm 30 is in a final, lowest position without contacting tailgate or bumper structures.

Figure 9B:
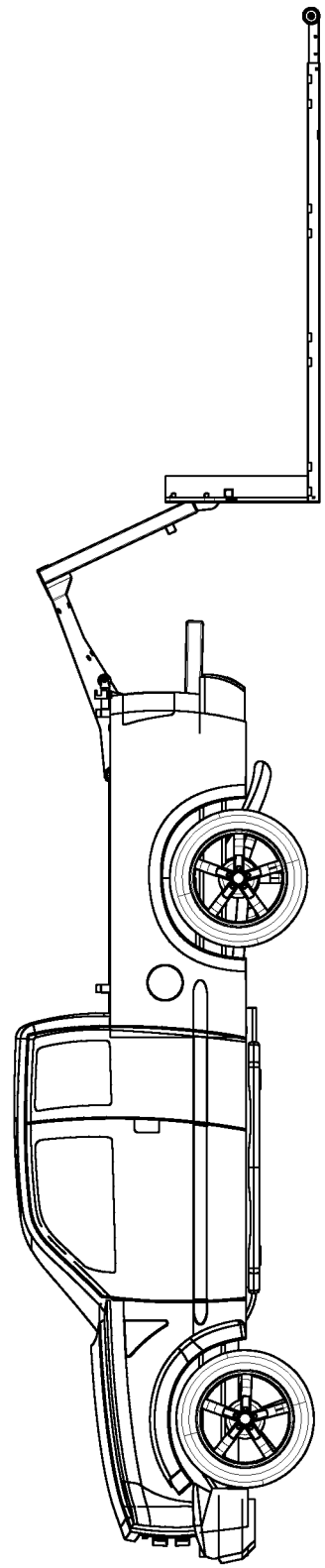
Figure 9C:
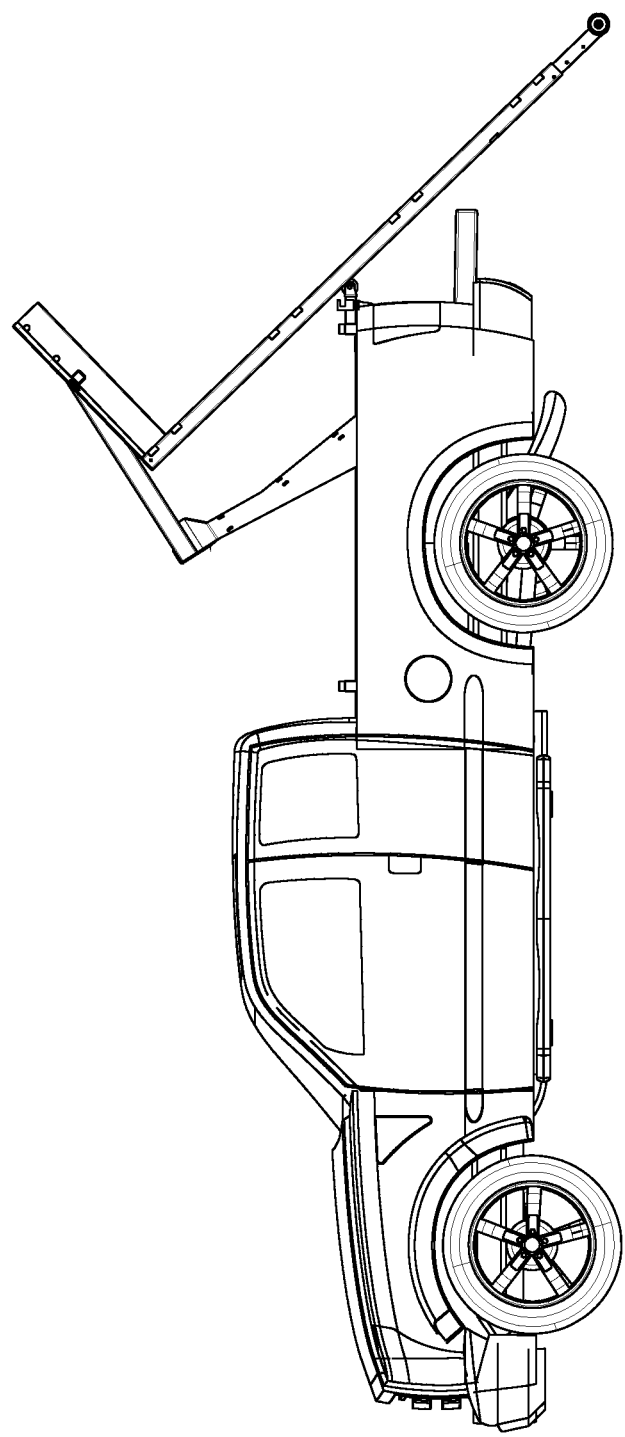
Figure 9D:
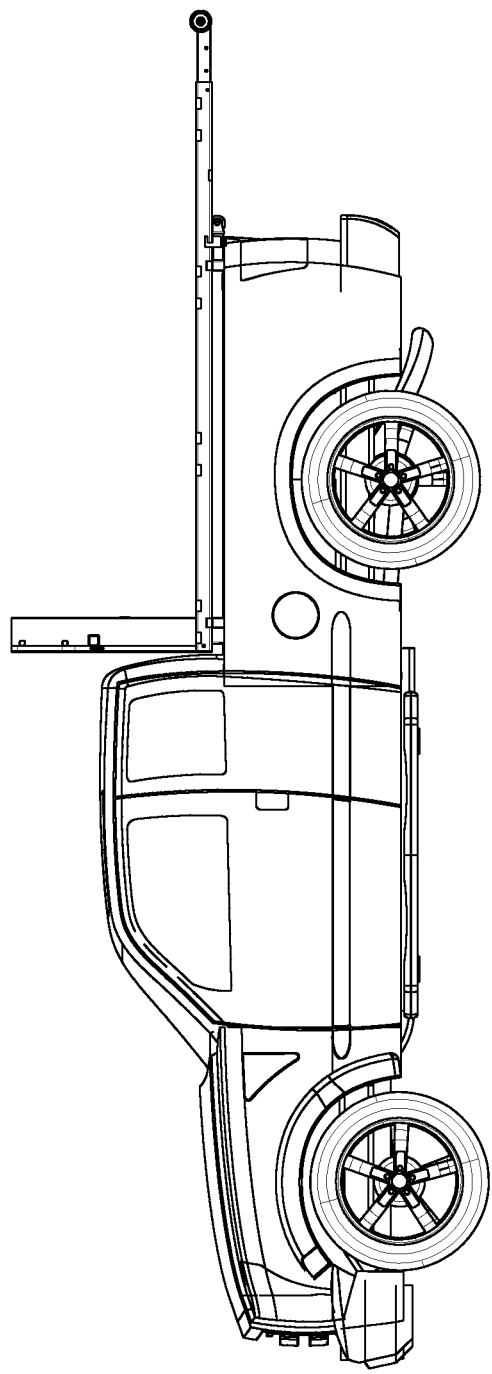

FIGS. 9a-9d illustrate side views of system 100 in use on a short-bed truck. As can be seen in FIG. 9b, primary arm 30 is in a final, lowest position without contacting tailgate or bumper structures, requiring only lowering of the tailgate.

What is claimed is:

1. A system for high capacity hydraulic truck loading, comprised of:
 a frame having a frame first end and a frame second end;
 a hydraulic cylinder pivotably attached to said frame at a first cylinder pivot on said frame first end;
 a primary arm having a L-shaped configuration and a primary arm base,
  wherein said primary arm base forms a non-straight angle with said primary arm,
  wherein said primary arm base is pivotably attached to said hydraulic cylinder at a second cylinder pivot;
 a secondary arm having a U-shaped configuration,
  wherein said primary arm base is pivotably attached to said secondary arm at at least one primary arm pivot,
  wherein said secondary arm is pivotably attached to said frame at a secondary arm pivot on said frame second end,
  wherein said at least one primary arm pivot is located distally to said secondary arm pivot; and
 a plurality of stabilizer arms,
  wherein each of said plurality of stabilizer arms includes a hole on each end,
  wherein said plurality of stabilizer arms are pivotably attached to said primary arm at said second cylinder pivot,
  wherein said plurality of stabilizer arms are pivotably attached to said frame at a stabilizer pivot on said frame second end,
  wherein said at least one primary arm pivot is located distally to said stabilizer pivot,
  wherein said secondary arm pivot is located at a greater height on said frame than said stabilizer pivot,
  wherein at least one of said plurality of stabilizer arms includes a pivot notch on one side of said at least one of said plurality of stabilizer arms, wherein a circular arc of said pivot notch corresponds to a circular arc of said secondary arm pivot.

2. The system of claim 1, wherein said frame includes a truck attachment interface removably attaching said frame to a truck bed by a plurality of fasteners.

3. The system of claim 1, wherein said frame includes a plurality of saddle attachment interfaces.

4. The system of claim 3, further comprising a plurality of saddle assemblies removably attached to said plurality of saddle attachment interfaces by a plurality of fasteners.

5. The system of claim 4, wherein said plurality of saddle assemblies include a plurality of post channels and a plurality of saddle posts.

6. The system of claim 5, wherein said saddle posts are removably attached to said plurality of post channels by a plurality of fasteners.

7. The system of claim 4, wherein one of said plurality of saddle assemblies has a hollow rectangular cross-section.

8. The system of claim 4, wherein one of said plurality of saddle assemblies has a reversed L-shaped cross-section.

9. The system of claim 4, further comprising a spacer removably attached between at least one of said plurality of saddle assemblies and at least one of said plurality of saddle attachment interfaces.

10. The system of claim 9, wherein said spacer includes a channel forestructure.

11. The system of claim 1, wherein said primary arm includes an integrated hook at an end of said primary arm opposite said primary arm base.

12. The system of claim 11, wherein said integrated hook is removable from said primary arm.

13. The system of claim 1, wherein said primary arm includes a locking protrusion.

14. The system of claim 13, wherein said locking protrusion is located adjacent to an end of said primary arm opposite said primary arm base.

15. The system of claim 1, wherein said secondary arm includes a secondary arm insert having a U-shaped configuration.

16. The system of claim 1, wherein said plurality of stabilizer arms bracket said frame second end.

17. The system of claim 1, wherein said plurality of stabilizer arms bracket said primary arm base.

18. The system of claim 1, wherein at least one of said plurality of stabilizer arms includes a strengthening projection on a side of said at least one of said plurality of stabilizer arms opposite said pivot notch.

* * * * *